United States Patent
Seidel et al.

(10) Patent No.: US 9,238,320 B2
(45) Date of Patent: Jan. 19, 2016

(54) PROCESS FOR THE PRODUCTION OF POLYURETHANE COMPOSITE COMPONENTS

(71) Applicant: BAYER MATERIALSCIENCE AG, Leverkusen (DE)

(72) Inventors: Andreas Seidel, Dormagen (DE); Rainer Protte, Dormagen (DE); Eckhard Wenz, Cologne (DE); Uli Franz, Solingen (DE); Philipp Moeller, Cologne (DE)

(73) Assignee: BAYER MATERIALSCIENCE AG, Leverkusen (DE)

( * ) Notice: Subject to any disclaimer, the term of this patent is extended or adjusted under 35 U.S.C. 154(b) by 0 days.

(21) Appl. No.: 14/202,135

(22) Filed: Mar. 10, 2014

(65) Prior Publication Data

US 2014/0239532 A1 Aug. 28, 2014

Related U.S. Application Data

(62) Division of application No. 12/961,346, filed on Dec. 6, 2010, now abandoned.

(30) Foreign Application Priority Data

Dec. 8, 2009 (DE) .......................... 10 2009 057 136

(51) Int. Cl.
*B29C 44/04* (2006.01)
*B29C 45/16* (2006.01)
(Continued)

(52) U.S. Cl.
CPC ......... *B29C 45/1679* (2013.01); *B29C 37/0028* (2013.01); *B29C 45/0001* (2013.01); *B29C 45/162* (2013.01); *B29C 45/1676* (2013.01); *B29C 45/78* (2013.01); *B29C 67/246* (2013.01); *B32B 5/18* (2013.01); *B32B 27/08* (2013.01); *B32B 27/36* (2013.01); *B32B 27/40* (2013.01); *B29C 2037/0035* (2013.01);
(Continued)

(58) Field of Classification Search
CPC ............ B29C 45/1679; B29C 37/0032; B29C 44/086
USPC ............ 264/45.1, 45.4, 45.5, 45.6, 46.5, 240, 264/241, 250, 255
See application file for complete search history.

(56) References Cited

U.S. PATENT DOCUMENTS

| 3,130,177 A | 4/1964 | Grabowski et al. |
| 4,310,373 A | 1/1982 | Schuhmacher et al. |

(Continued)

FOREIGN PATENT DOCUMENTS

| DE | 19650854 | 3/1998 |
| DE | 197 46 265 | 4/1999 |

(Continued)

OTHER PUBLICATIONS

Foreign Language Search Report and Written Opinion of PCT/EP2010/069117.

(Continued)

*Primary Examiner* — Stella Yi
(74) *Attorney, Agent, or Firm* — Miles & Stockbridge PC

(57) ABSTRACT

A composite and process for the production of a composite component, comprising a) a support of a thermoplastic composition, and b) at least one polyurethane layer in direct contact with the support.

16 Claims, 1 Drawing Sheet

(51) Int. Cl.
  *B29C 37/00* (2006.01)
  *B29C 45/00* (2006.01)
  *B29C 45/78* (2006.01)
  *B29C 67/24* (2006.01)
  *B32B 5/18* (2006.01)
  *B32B 27/08* (2006.01)
  *B32B 27/36* (2006.01)
  *B32B 27/40* (2006.01)
  *B29K 69/00* (2006.01)
  *B29K 75/00* (2006.01)

(52) U.S. Cl.
  CPC ........ *B29K 2069/00* (2013.01); *B29K 2075/00* (2013.01); *B32B 2250/03* (2013.01); *B32B 2266/02* (2013.01); *B32B 2266/0278* (2013.01); *B32B 2605/003* (2013.01); *B32B 2605/08* (2013.01); *B32B 2605/18* (2013.01); *Y10T 428/31507* (2015.04); *Y10T 428/31565* (2015.04)

(56) References Cited

U.S. PATENT DOCUMENTS

| | | | |
|---|---|---|---|
| 5,910,538 | A | 6/1999 | Padwa et al. |
| 6,558,599 | B1 | 5/2003 | Bethune |
| 7,790,089 | B2 | 9/2010 | Zoellner |
| 2002/0160177 | A1 | 10/2002 | Warth et al. |
| 2003/0197307 | A1 | 10/2003 | Kitamura |
| 2006/0106125 | A1 | 5/2006 | Leitner et al. |
| 2006/0151911 | A1 | 7/2006 | Zollner et al. |
| 2006/0189739 | A1 | 8/2006 | Wenz et al. |
| 2008/0292864 | A1 | 11/2008 | Volkel et al. |
| 2011/0159292 | A1* | 6/2011 | Eckel et al. ............ 428/412 |

FOREIGN PATENT DOCUMENTS

| | | |
|---|---|---|
| DE | 101 09 226 | 9/2002 |
| DE | 102006048252 | 12/2007 |
| DE | 10 2007 051482 | 4/2009 |
| EP | 0 230 282 | 7/1987 |
| EP | 1 666 225 | 6/2006 |
| KR | 100 798 614 | 1/2008 |
| WO | 2006/072366 | 7/2006 |
| WO | 2006072366 | 7/2006 |

OTHER PUBLICATIONS

German Language Internation Preliminary Report on Patentability for PCT/EP2010/069117 Date of Issurance Jun. 12, 2012.

Mahmood, Nasir "Investigations on the Adhesion of Polyurethane Foams on Thermoplastic Material Systems" Jan. 28, 2005, pp. 15-16, 18-19, 21-23, 32-33 and 46.

Bonding Low Surface Enery Plastics, Jun. 15, 2000, Machine Design, pp. 1-2.

* cited by examiner

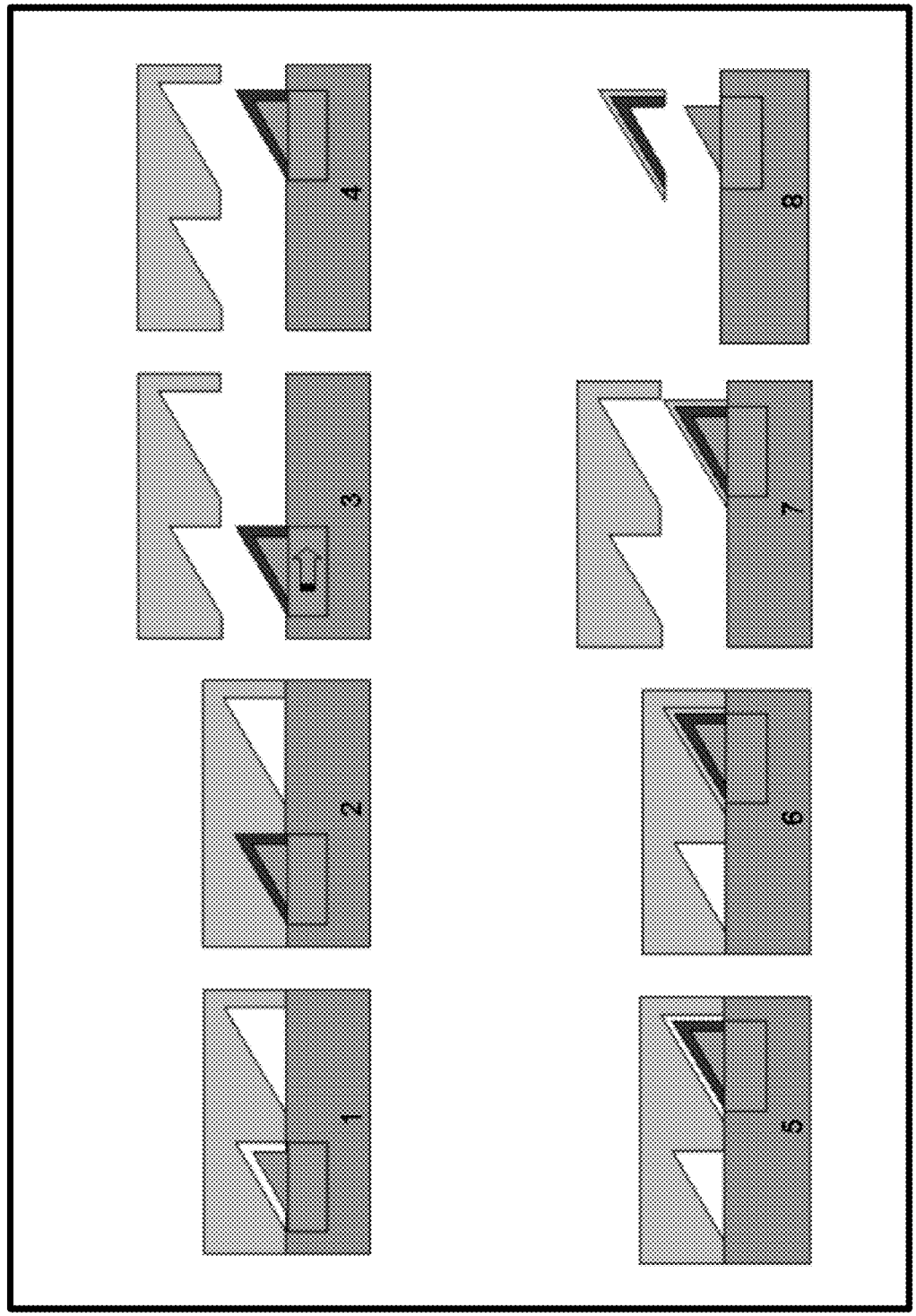

PROCESS FOR THE PRODUCTION OF POLYURETHANE COMPOSITE COMPONENTS

CROSS REFERENCE TO RELATED APPLICATION

This is a Divisional application of U.S. application Ser. No. 12/961,346, filed Dec. 6, 2010, which claims priority to German Application 102009057136.1 filed Dec. 8, 2009 and German Application 102009058180.4 filed Dec. 15, 2009, the entire content of each application is herein incorporated by reference in its entirety.

BACKGROUND

1. Field of the Invention

The present invention relates to a process for the production of composite components with a stable adhesive bond, these comprising a structure-imparting support of a thermoplastic and at least one polyurethane layer in direct contact with this support.

2. Description of Related Art

The present invention moreover relates to the use of specific polycarbonate compositions of high melt flowability and toughness in a 2-component injection moulding or 2-component reactive injection moulding process [2C-(R)IM] for the production of a two- or multicomponent part which is distinguished by good adhesive bonding of the PU coating(s) to the support material.

The present invention also provides composite components with a high toughness and stable adhesive bond, these comprising a structure-imparting support of a thermoplastic and at least one polyurethane layer in direct contact with this support, and the use thereof.

DE 196 50 854 C1 discloses a process for the production of a multilayered part of plastic in which an injection moulded part of plastic is coated with at least one layer of a 2-component thermoset, preferably polyurethane. In this process, the part of plastic and the layer of 2-component thermoset are injection moulded successively in a synchronous cycle in the same mould. No indications are given in DE 196 50 854 C1 of the influence of the nature of the support material and of the process parameters on the adhesion between the carrier material and the layer of the composite component joined to this.

U.S. Pat. No. 6,558,599 B1 describes a process for the production of a lacquered part from a formed thermoplastic material. The process comprises the steps a) injection moulding of the thermoplastic material in a first cavity of a mould for forming the part, b) opening of the mould for cooling at least the surface of the part, as a result of which shrinkage of the part occurs, and c) injection of a lacquer into a second cavity of the mould with the part, the second cavity having the same dimensions as the first cavity.

Lacquers which are mentioned as possible in this application are also those based on polyurethane.

However, in U.S. Pat. No. 6,558,599 B1 neither is the support material specified in more detail, nor is an influence of the support material composition on the adhesion properties of the composite component indicated.

WO 2006/072366 A1 describes a process for forming and coating a substrate in a mould with at least two cavities. The process comprises the steps:

a) forming of a substrate in a first cavity of the mould, b) introduction of the substrate produced in the preceding step into a second cavity of the mould and c) coating of the substrate in the second cavity with a lacquer, the coating being carried out under increased pressure.

Polyurethane lacquers and PC+ABS substrates (polycarbonate+acrylonitrile/butadiene/styrene substrates) are mentioned by way of example and are preferred. This application says nothing about the influence of the composition of the support and polyurethane material and of possible temperature influences during forming on the adhesive bond.

DE 10 2006 048 252 B3 discloses a process for the production of a composite component, in particular comprising an injection moulded part and a polyurethane element, with the steps a) production of a support component, b) introduction or transfer of the support component into an opened cavity of a mould, c) closing of the mould to a predetermined position, an enlarged cavity with a first size being created, d) generation of a reduced pressure in the enlarged cavity of the first size, e) filling of the enlarged cavity with a flooding material and f) carrying out an embossing step at the same time as the filling and/or after the filling with the flooding material, the cavity being at least slightly reduced in size.

A process as in the present invention in combination with specific compositions for the production of the composite components which have an increased adhesion is not disclosed in DE 10 2006 048 252 B3.

DE 10 2006 033 059 A1 discloses a process for the production of interior parts of plastic. In this, the support is formed in a first mould in a first step, the first mould then being replaced at least in part by a second mould, and the top layer then being formed on the support in a second step. In this process, a hard component, e.g. PA+ABS blends (polyamide+acrylonitrile/butadiene/styrene) or PC+ABS blends (polycarbonate+acrylonitrile/butadiene/styrene), is employed as the support material, and a soft component, preferably polyurethane foam, is employed as the top layer. No indications of the influence of the process parameters and of the composition of the support and polyurethane materials on the bonding properties of the components produced in this way are given in the application. Rather, in DE 10 206 033 059 A1 improvement of the adhesion by primers or laser, corona or plasma treatment is proposed.

SUMMARY

A technical object of the present invention was thus to provide a process for the production of composite components with a stable adhesive bond comprising (a) a structure-imparting support of a thermoplastic and (b) at least one polyurethane layer in direct contact with this support.

A further technical object was to provide polycarbonate compositions of high melt flowability and toughness which, in a coating operation with a polyurethane system in a 2-component injection moulding process or 2-component (reactive) injection moulding process, achieve a good adhesion of the coating to the support material.

An object of the present invention was moreover also to provide composite components with a high toughness and stable adhesive bond, these comprising a structure-imparting support of a thermoplastic and at least one polyurethane layer in direct contact with this support and being produced in 2-component injection moulding process or 2-component (reactive) injection moulding process.

In this context, the polyurethane layer can serve, for example, to improve the surface properties, the haptic properties, the visual properties and the noise and heat insulation of the composite components. These and other objects of the present invention can be achieved, for example, by a process for the production of a composite component comprising a) a support of a thermoplastic composition and b) at least one polyurethane layer in direct contact with the support, in which (i) in a first process step the melt of the thermoplastic composition is injected into a first mould cavity and is subsequently cooled, the thermoplastic composition comprising A) 65.0 to 90.0 parts by wt., based on the sum of components A and B, of at least one polymer chosen from the group of aromatic polycarbonates, aromatic polyester carbonates and aromatic polyesters, B) 10.0 to 35.0 parts by wt., based on the sum of components A and B, of an optionally rubber-modified vinyl (co)polymer and C) 0 to 30.0 parts by wt., based on the sum of components A to C, of at least one commercially available polymer additive, (ii) in a second process step the cavity of the injection mould is enlarged and a gap is thereby generated, (iii) in the third process step a reactive polyurethane raw material mixture comprising at least one polyisocyanate component, at least one polyfunctional H-active compound, and optionally at least one polyurethane additive and/or process auxiliary substance is introduced with high pressure or low pressure machines into the gap resulting in this way between the thermoplastic component and the mould surface of the enlarged cavity, the polyurethane raw material mixture polymerizing completely in contact with the surface of the thermoplastic support to give a compact polyurethane layer or to give a polyurethane foam layer, (iv) in the fourth process step the composite component is removed from the mould cavity.

Advantageously, the process steps follow one another directly.

DETAILED DESCRIPTION OF THE FIGURES

FIG. 1 shows an example process for the production of a composite component according to the disclosure.

DETAILED DESCRIPTION OF A PREFERRED EMBODIMENT

The direct sequence of the process steps prevents the temperature of the workpiece from cooling to room temperature during the process. A reduction in production times and a higher energy efficiency of the overall process are achieved by this means.

Process steps (ii) and (iii) can be repeated at least once with variation in the polyurethane system, one or more polyurethane layers being applied to only one or both sides of the support, so that a composite component of thermoplastic support and at least two identical or different PU components with optionally also more than a two-layered structure results.

Before the removal of the workpiece from the moulds in steps (ii) and (iv), the workpiece is cooled until dimensionally stable.

To generate the gap in process step (ii), either the injection mould can be opened and one half of the injection mould cavity can subsequently be replaced by a new half with larger mould dimensions, or the component is transferred from the first mould cavity into a second cavity, which is larger with respect to its mould dimensions, of the same or of a second mould, or the first cavity is opened by a gap.

The transfer of the substrate in process step (ii) can be carried out by known processes, such as are used, for example, in multicoloured injection moulding. Typical processes are on the one hand transfer with a rotary table, turning plate, sliding cavity or index plate, or comparable processes in which the substrate remains on a core. If the substrate remains on the core for the transfer, this has the advantage that the position is also defined with an exact fit after the transfer. On the other hand, processes for transfer of a substrate in which the substrate is removed from one cavity, e.g. with the aid of a handling system, and laid in another cavity are known from the prior art. Transfer with removal of the substrate offers more latitude in the design of the coating, e.g. in the generation of a fold or masked regions.

In this context, the polyurethane layer can be, for example, a PU lacquer, a PU foam or a compact PU skin.

The polyurethane layers produced with this process can have, for example, thicknesses of from 1 μm up to 20 cm.

In a preferred embodiment, the polyurethane layer is a lacquer with a layer thickness of 1-1,000 μm.

In a further preferred embodiment, the polyurethane layer is a compact skin with a layer thickness of 1 mm-10 mm.

In a further preferred embodiment, the polyurethane layer is a foam with a layer thickness of 1 cm-20 cm.

In a preferred embodiment, the thermoplastic compositions of the support a) comprise:

A) 65.0 to 80.0 parts by wt., in particular 70.0 to 80.0 parts by wt., based on the sum of components A and B, of at least one polymer chosen from the group of aromatic polycarbonates, aromatic polyester carbonates and aromatic polyesters and B) 20.0 to 35.0 parts by wt., in particular 20.0 to 30.0 parts by wt., based on the sum of components A and B, of an optionally rubber-modified vinyl (co)polymer.

Component C is preferably employed in a content of from 0.1 to 15.0 parts by wt., in particular 0.2 to 5.0 parts by wt., based on the sum of components A to C.

In a particularly preferred embodiment, a mixture of at least one aromatic polycarbonate and/or polyester carbonate and at least one aromatic polyester is employed as component A.

The reactive polyurethane raw material mixture preferably has a characteristic number of from >90 to <125, preferably >100 to <120, and particularly preferably from 105 to 115. The characteristic number is defined as the percentage ratio of the amount of isocyanate actually employed to the calculated stoichiometric amount in the event of complete reaction of the polyol, i.e. characteristic number=(amount of isocyanate employed/calculated stoichiometric amount of isocyanate)*100.

In an alternative embodiment, a thermoplastic polyurethane can also be used instead of the reactive polyurethane raw material mixture.

In a further preferred embodiment, the surface of the injection mould in contact with the thermoplastic polymer composition is temperature-controlled in process step (iii) at a temperature in the range of 50 to 95° C., preferably 60 to 85° C. and particularly preferably 60 to 80° C.

In a further preferred embodiment, the surface of the injection mould in contact with the reactive polyurethane mixture is temperature-controlled in process step (iii) at a temperature in the range of 50 to 160° C., preferably 70 to 120° C., more preferably 80 to 110° C. and particularly preferably 90 to 100° C.

In a more preferred embodiment, the surface of the injection mould in contact with the thermoplastic polymer composition is temperature-controlled in process step (iii) at a temperature in the range of 50 to 95° C., preferably 60 to 85° C. and particularly preferably 60 to 80° C. and the surface of the injection mould in contact with the reactive polyurethane mixture is temperature-controlled at a temperature in the range of 50 to 160° C., preferably 70 to 120° C., more preferably 80 to 110° C. and particularly preferably 90 to 100° C.

In a preferred embodiment, in process step (iii) the temperature of the mould cavity on the polyurethane side is at least 10° C., preferably at least 15° C., particularly preferably at least 20° C. higher than the temperature of the mould cavity on the support side (thermoplastic side).

An alternative process for the production of a composite component is furthermore disclosed, comprising:
 a) a support of a thermoplastic composition and
 b) at least one polyurethane layer in direct contact with the support,
 in which
 (i) in a first process step the melt of the thermoplastic composition is injected into a first mould cavity and is subsequently cooled,
 (ii) in a second process step the cavity of the injection mould is enlarged and a gap is thereby generated,
 (iii) in the third process step a reactive polyurethane raw material mixture comprising
 at least one polyisocyanate component,
 at least one polyfunctional H-active compound, and
 optionally at least one polyurethane additive and/or process auxiliary substance
 is injected into the gap resulting in this way between the thermoplastic component and the mould surface of the enlarged cavity, the polyurethane raw material mixture polymerizing completely in contact with the surface of the thermoplastic support to give a compact polyurethane layer or to give a polyurethane foam layer,
 (iv) in the fourth process step the composite component is removed from the mould cavity,
 wherein process steps (ii) and (III) can be passed through several times, the process steps follow one another directly, and in process step (iii) the temperature of the mould cavity on the polyurethane side is at least 10° C., preferably at least 15° C., particularly preferably at least 20° C. higher than the temperature of the mould cavity on the support side (thermoplastic side).

In a preferred embodiment, a thermoplastic polymer composition which shows, at room temperature and particularly preferably also at −30° C., tough fracture properties in the notched impact test according to ISO 180-1A, characterized by a notched impact strength value of greater than 25 kJ/m$^2$, and/or a tough (non-splintering) fracture pattern in the impact penetration test according to ISO 6603, is used in the first process step.

The present invention furthermore relates to the use of compositions comprising
 A) 65.0 to 90.0 parts by wt., based on the sum of components A and B, of at least one polymer chosen from the group of aromatic polycarbonates, aromatic polyester carbonates and aromatic polyesters,
 B) 10.0 to 35.0 parts by wt., based on the sum of components A and B, of an optionally rubber-modified vinyl (co)polymer and
 C) 0 to 30.0 parts by wt., based on the sum of components A to C, of at least one commercially available polymer additive
for the production of a two- or multicomponent composite component, coated with at least one polyurethane, in a 2-component injection moulding or 2-component reactive injection moulding process.

Component A here is preferably a mixture of at least one aromatic polycarbonate and/or polyester carbonate and at least one aromatic polyester.

The present invention moreover relates to composite components comprising
 a) a support of a composition comprising
 A) 65.0 to 90.0 parts by wt., based on the sum of components A and B, of at least one polymer chosen from the group of aromatic polycarbonates, aromatic polyester carbonates and aromatic polyesters,
 B) 10.0 to 35.0 parts by wt., based on the sum of components A and B, of an optionally rubber-modified vinyl (co)polymer and
 C) 0 to 30.0 parts by wt., based on the sum of components A to C, of at least one commercially available polymer additive and
 b) at least one polyurethane layer in direct contact with the support
produced by a 2-component injection moulding or 2-component reactive injection moulding process.

Component A here is preferably a mixture of at least one aromatic polycarbonate and/or polyester carbonate and at least one aromatic polyester.

The composite components are preferably produced by a 2-component reactive injection moulding process with a reactive polyurethane raw material mixture comprising
 at least one polyisocyanate component,
 at least one polyfunctional H-active compound and
 optionally at least one polyurethane additive and/or process auxiliary substance,
wherein the reactive polyurethane raw material mixture has a characteristic number of from >90 to <125, preferably >100 to <120, and particularly preferably from 105 to 115.

In a particularly preferred embodiment, the composite component shows, at −30° C., tough (non-splintering) fracture properties under multiaxial impact stress, measured on the fracture pattern in the impact penetration test according to ISO 6603.

In a preferred embodiment, the adhesive bond between the support of polycarbonate composition and the polyurethane coating in the composite components according to the invention is at least 1N/mm, measured in a roller peel test according to DIN 53357 A at a test speed of 100 mm/min on strip samples with a width of 20 mm taken from the component.

The composite components produced according to the invention are preferably suitable for use as an interior or exterior component of a track, air travel or motor vehicle.

The polymer compositions employed in the process according to the invention comprise:

Component A

Aromatic polycarbonates and polyester carbonates according to component A which are suitable according to the invention are known from the literature or can be prepared by processes known from the literature (for the preparation of aromatic polycarbonates see, for example, Schnell, "Chemistry and Physics of Polycarbonates", Interscience Publishers, 1964 and DE-AS 1 495 626, DE-A 2 232 877, DE-A 2 703 376, DE-A 2 714 544, DE-A 3 000 610, DE-A 3 832 396; for the preparation of aromatic polyester carbonates e.g. DE-A 3 077 934).

Aromatic polycarbonates and polyester carbonates are prepared e.g. by reaction of diphenols with carbonic acid halides, preferably phosgene, and/or with aromatic dicarboxylic acid dihalides, preferably benzenedicarboxylic acid dihalides, by the interfacial process, optionally using chain terminators, for example monophenols, and optionally using branching agents which are trifunctional or more than trifunctional, for example triphenols or tetraphenols. A preparation via a melt polymerization process by reaction of diphenols with, for example, diphenyl carbonate is likewise possible.

Diphenols for the preparation of the aromatic polycarbonates and/or aromatic polyester carbonates are preferably those of the formula (I)

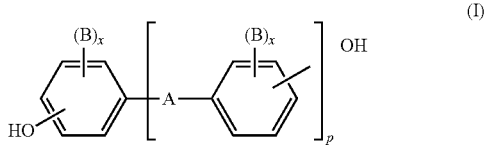

wherein

A is a single bond, $C_1$ to $C_5$-alkylene, $C_2$ to $C_5$-alkylidene, $C_5$ to $C_6$-cycloalkylidene, —O—, —SO—, —CO—, —S—, —SO$_2$—, $C_6$ to $C_{12}$-arylene, on to which further aromatic rings optionally containing hetero atoms can be fused, or a radical of the formula (II) or (III)

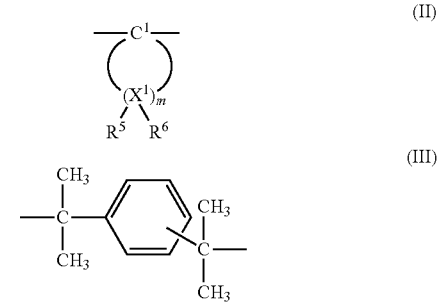

B is in each case $C_1$ to $C_{12}$-alkyl, preferably methyl, halogen, preferably chlorine and/or bromine, x is in each case independently of each other 0, 1 or 2, P is 1 or 0, and $R^5$ and $R^6$ can be chosen individually for each $X^1$ and independently of each other denote hydrogen or $C_1$ to $C_6$-alkyl, preferably hydrogen, methyl or ethyl, $X^1$ denotes carbon and m denotes an integer from 4 to 7, preferably 4 or 5, with the proviso that on at least one atom $X^1$ $R^5$ and $R^6$ are simultaneously alkyl.

Preferred diphenols are hydroquinone, resorcinol, dihydroxydiphenols, bis-(hydroxyphenyl)-$C_1$-$C_5$-alkanes, bis-(hydroxyphenyl)-$C_5$-$C_6$-cycloalkanes, bis-(hydroxyphenyl) ethers, bis-(hydroxyphenyl) sulfoxides, bis-(hydroxyphenyl) ketones, bis-(hydroxyphenyl) sulfones and α,α-bis-(hydroxyphenyl)-diisopropyl-benzenes and derivatives thereof brominated on the nucleus and/or chlorinated on the nucleus.

Particularly preferred diphenols are 4,4'-dihydroxydiphenyl, bisphenol-A, 2,4-bis(4-hydroxyphenyl)-2-methylbutane, 1,1-bis-(4-hydroxyphenyl)-cyclohexane, 1,1-bis-(4-hydroxyphenyl)-3,3,5-trimethylcyclohexane, 4,4'-dihydroxydiphenyl sulfide, 4,4'-dihydroxydiphenyl sulfone and di- and tetrabrominated or chlorinated derivatives thereof, such as, for example, 2,2-bis(3-chloro-4-hydroxyphenyl)-propane, 2,2-bis-(3,5-dichloro-4-hydroxyphenyl)-propane or 2,2-bis-(3,5-dibromo-4-hydroxy-phenyl)-propane. 2,2-Bis-(4-hydroxyphenyl)-propane (bisphenol A) is particularly preferred.

The diphenols can be employed individually or as any desired mixtures. The diphenols are known from the literature or obtainable by processes known from the literature.

Chain terminators which are suitable for the preparation of the thermoplastic aromatic polycarbonates are, for example, phenol, p-chlorophenol, p-tert-butylphenol or 2,4,6-tribromophenol, but also long-chain alkylphenols, such as 4-[2-(2,4,4-trimethylpentyl)]-phenol, 4-(1,3-tetramethylbutyl)-phenol according to DE-A 2 842 005 or monoalkylphenols or dialkylphenols having a total of 8 to 20 carbon atoms in the alkyl substituents, such as 3,5-di-tert-butylphenol, p-iso-octylphenol, p-tert-octylphenol, p-dodecylphenol and 2-(3,5-dimethylheptyl)-phenol and 4-(3,5-dimethylheptyl)-phenol. The amount of chain terminators to be employed is in general between 0.5 mol % and 10 mol %, based on the sum of the moles of the particular diphenols employed.

The thermoplastic aromatic polycarbonates can be branched in a known manner, and in particular preferably by incorporation of from 0.05 to 2.0 mol %, based on the sum of the diphenols employed, of compounds which are trifunctional or more than trifunctional, for example those having three and more phenolic groups.

Both homopolycarbonates and copolycarbonates are suitable. 1 to 25 wt. %, preferably 2.5 to 25 wt. %, based on the total amount of diphenols to be employed, of polydiorganosiloxanes having hydroxyaryloxy end groups can also be employed for the preparation of the copolycarbonates according to the invention according to component A. These are known (U.S. Pat. No. 3,419,634) and can be prepared by processes known from the literature. The preparation of copolycarbonates containing polydiorganosiloxane is described in DE-A 3 334 782.

Preferred polycarbonates are, in addition to bisphenol A homopolycarbonates, copolycarbonates of bisphenol A with up to 15 mol %, based on the sum of the moles of diphenols, of other diphenols mentioned as preferred or particularly preferred, in particular 2,2-bis(3,5-dibromo-4-hydroxyphenyl)-propane.

Aromatic dicarboxylic acid dihalides for the preparation of aromatic polyester carbonates are preferably the diacid dichlorides of isophthalic acid, terephthalic acid, diphenyl ether 4,4'-dicarboxylic acid and of naphthalene-2,6-dicarboxylic acid.

Mixtures of the diacid dichlorides of isophthalic acid and of terephthalic acid in a ratio of between 1:20 and 20:1 are particularly preferred.

A carbonic acid halide, preferably phosgene, is additionally co-used as a bifunctional acid derivative in the preparation of polyester carbonates.

Possible chain terminators for the preparation of the aromatic polyester carbonates are, in addition to the monophenols already mentioned, also chlorocarbonic acid esters thereof and the acid chlorides of aromatic monocarboxylic acids, which can optionally be substituted by $C_1$ to $C_{22}$-alkyl groups or by halogen atoms, and aliphatic $C_2$ to $C_{22}$-monocarboxylic acid chlorides.

The amount of chain terminators is in each case 0.1 to 10 mol %, based on the moles of diphenol in the case of the phenolic chain terminators and on the moles of dicarboxylic acid dichloride in the case of monocarboxylic acid chloride chain terminators.

The aromatic polyesters carbonates can also contain incorporated aromatic hydroxycarboxylic acids.

The aromatic polyester carbonates can be either linear or branched in a known manner (in this context see DE-A 2 940 024 and DE-A 3 007 934).

Branching agents which can be used are, for example, carboxylic acid chlorides which are trifunctional or more than trifunctional, such as trimeric acid trichloride, cyanuric acid trichloride, 3,3',4,4'-benzophenone-tetracarboxylic acid tetrachloride, 1,4,5,8-naphthalenetetracarboxylic acid tetrachloride or pyromellitic acid tetrachloride, in amounts of from 0.01 to 1.0 mol-% (based on the dicarboxylic acid dichlorides employed), or phenols which are trifunctional or more than trifunctional, such as phloroglucinol, 4,6-dimethyl-2,4,6-tri-(4-hydroxyphenyl)-hept-2-ene, 4,6-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenylmethane, 2,2-bis[4,4-bis(4-hydroxyphenyl)-cyclohexyl]-propane, 2,4-bis(4-hydroxyphenyl-isopropyl)-phenol, tetra-(4-hydroxyphenyl)-methane, 2,6-bis(2-hydroxy-5-methyl-benzyl)-4-methylphenol, 2-(4-hydroxyphenyl)-2-(2,4-dihydroxyphenyl)-propane, tetra-(4-[4-hydroxy-phenyl-isopropyl]-phenoxy)-methane, 1,4-bis[4,4'-dihydroxytriphenyl)-methyl]-benzene, in amounts of from 0.01 to 1.0 mol %, based on the diphenols employed. Phenolic branching agents can be initially introduced with the diphenols, and acid chloride branching agents can be introduced together with the acid dichlorides.

The content of carbonate structural units in the thermoplastic aromatic polyester carbonates can vary as desired. Preferably, the content of carbonate groups is up to 100 mol %, in particular up to 80 mol %, particularly preferably up to 50 mol %, based on the sum of ester groups and carbonate groups. Both the ester and the carbonate content of the aromatic polyester carbonates can be present in the polycondensate in the form of blocks or in random distribution.

The relative solution viscosity ($\eta_{rel}$) of the aromatic polycarbonates and polyester carbonates is preferably in the range of 1.18 to 1.4, particularly preferably in the range of 1.20 to 1.32 (measured on solutions of 0.5 g of polycarbonate or polyester carbonate in 100 ml of methylene chloride solution at 25° C.). The weight-average molecular weight Mw of the aromatic polycarbonates and polyester carbonates is preferably in the range of from 15,000 to 35,000, more preferably in the range of from 20,000 to 33,000, particularly preferably 23,000 to 30,000, determined by GPC (gel permeation chromatography in methylene chloride with polycarbonate as the standard).

In a preferred embodiment, the aromatic polyesters possible according to the invention as component A are polyalkylene terephthalates. In a particularly preferred embodiment, these are reaction products of aromatic dicarboxylic acids or their reactive derivatives, such as dimethyl esters or anhydrides, and aliphatic, cycloaliphatic or araliphatic diols, and mixtures of these reaction products.

Particularly preferred polyalkylene terephthalates contain at least 80 wt. %, preferably at least 90 wt. %, based on the dicarboxylic acid component, of terephthalic acid radicals and at least 80 wt. %, preferably at least 90 mol %, based on the diol component, of radicals of ethylene glycol and/or butane-1,4-diol.

The preferred polyalkylene terephthalates can contain, in addition to terephthalic acid radicals, up to 20 mol %, preferably up to 10 mol % of radicals of other aromatic or cycloaliphatic dicarboxylic acids having 8 to 14 C atoms or aliphatic dicarboxylic acids having 4 to 12 C atoms, such as e.g. radicals of phthalic acid, isophthalic acid, naphthalene-2,6-dicarboxylic acid, 4,4'-diphenyldicarboxylic acid, succinic acid, adipic acid, sebacic acid, azelaic acid and cyclohexanediacetic acid.

The preferred polyalkylene terephthalates can contain, in addition to radicals of ethylene glycol or butane-1,4-diol, up to 20 mol %, preferably up to 10 mol % of other aliphatic diols having 3 to 12 C atoms or cycloaliphatic diols having 6 to 21 C atoms, e.g. radicals of propane-1,3-diol, 2-ethylpropane-1,3-diol, neopentyl glycol, pentane-1,5-diol, hexane-1,6-diol, cyclohexane-1,4-dimethanol, 3-ethylpentane-2,4-diol, 2-methylpentane-2,4-diol, 2,2,4-trimethylpentane-1,3-diol, 2-ethylhexane-1,3-diol, 2,2-diethylpropane-1,3-diol, hexane-2,5-diol, 1,4-di-(β-hydroxyethoxy)-benzene, 2,2-bis-(4-hydroxycyclohexyl)-propane, 2,4-dihydroxy-1,1,3,3-tetramethyl-cyclobutane, 2,2-bis-(4-β-hydroxyethoxyphenyl)-propane and 2,2-bis-(4-hydroxypropoxyphenyl)-propane (DE-A 2 407 674, 2 407 776, 2 715 932).

The polyalkylene terephthalates can be branched by incorporation of relatively small amounts of 3- or 4-hydric alcohols or 3- or 4-basic carboxylic acids, e.g. in accordance with DE-A 1 900 270 and U.S. Pat. No. 3,692,744. Examples of preferred branching agents are trimesic acid, trimellitic acid, trimethylolethane and -propane and pentaerythritol.

Polyalkylene terephthalates which have been prepared solely from terephthalic acid and reactive derivatives thereof (e.g. dialkyl esters thereof) and ethylene glycol and/or butane-1,4-diol, and mixtures of these polyalkylene terephthalates are particularly preferred.

Mixtures of polyalkylene terephthalates contain 1 to 50 wt. %, preferably 1 to 30 wt. % of polyethylene terephthalate and 50 to 99 wt. %, preferably 70 to 99 wt. % of polybutylene terephthalate.

The polyalkylene terephthalates preferably used in general have a limiting viscosity of from 0.4 to 1.5 dl/g, preferably 0.5 to 1.2 dl/g, measured in phenol/o-dichlorobenzene (1:1 parts by weight) at 25° C. in an Ubbelohde viscometer.

The polyalkylene terephthalates can be prepared by known methods (see e.g. Kunststoff-Handbuch, volume VIII, p. 695 et seq., Carl-Hanser-Verlag, Munich 1973).

Component B

Component B comprises rubber-based graft polymers or rubber-free vinyl (co)polymers or a mixture of several such polymers.

Rubber-based graft polymers B.1 employed as component B comprise

B.1.1 5 to 95, preferably 15 to 92, in particular 25 to 60 wt. %, based on component B.1, of at least one vinyl monomer on B.1.2 95 to 5, preferably 85 to 8, in particular 75 to 40 wt. %, based on component B.1, of one or more graft bases having glass transition temperatures of <10° C., preferably <0° C., particularly preferably <−20° C.

The glass transition temperature was determined by means of dynamic differential calorimetry (DSC) in accordance with the standard DIN EN 61006 at a heating rate of 10 K/min with definition of the $T_g$ as the midpoint temperature (tangent method)

The graft base B.1.2 in general has an average particle size ($d_{50}$ value) of from 0.05 to 10 μm, preferably 0.1 to 5 μm, particularly preferably 0.2 to 1 μm.

The average particle size $d_{50}$ is the diameter above and below which in each case 50 wt. % of the particles lie. It can be determined by means of ultracentrifuge measurement (W. Scholtan, H. Lange, Kolloid, Z. and Z. Polymere 250 (1972), 782-1796).

Monomers B.1.1 are preferably mixtures of

B.1.1.1 50 to 99, preferably 65 to 85, in particular 75 to 80 parts by wt., based on B.1.1, of vinylaromatics and/or vinylaromatics substituted on the nucleus (such as styrene, α-methylstyrene, p-methylstyrene, p-chlorostyrene) and/or methacrylic acid ($C_1$-$C_8$)-alkyl esters (such as methyl methacrylate, ethyl methacrylate) and B.1.1.2 1 to 50, preferably 15 to 35, in particular 20 to 25 parts by wt., based on B.1.1, of vinyl cyanides (unsaturated nitriles, such as acrylonitrile and methacrylonitrile) and/or (meth)acrylic acid ($C_1$-$C_8$)-alkyl esters, such as methyl methacrylate, n-butyl acrylate, t-butyl acrylate, and/or derivatives (such as anhydrides and imides) of unsaturated carboxylic acids, for example maleic anhydride and N-phenyl-maleimide.

Preferred monomers B.1.1.1 are chosen from at least one of the monomers styrene, α-methylstyrene and methyl methacrylate, and preferred monomers B.1.1.2 are chosen from at least one of the monomers acrylonitrile, maleic anhydride and methyl methacrylate. Particularly preferred monomers are B.1.1.1 styrene and B.1.1.2 acrylonitrile.

Graft bases B.1.2 which are suitable for the graft polymers B.1 are, for example, diene rubbers, EP(D)M rubbers, that is to say those based on ethylene/propylene and optionally diene, and acrylate, polyurethane, silicone, chloroprene and ethylene/vinyl acetate rubbers and silicone/acrylate composite rubbers.

Preferred graft bases B.1.2 are diene rubbers, for example based on butadiene and isoprene, or mixtures of diene rubbers or copolymers of diene rubbers or mixtures thereof with further copolymerizable monomers (e.g. according to B.1.1.1 and B.1.1.2), with the proviso that the glass transition temperature of component B.1.2 is below <10° C., preferably <0° C., particularly preferably <−20° C.

Pure polybutadiene rubber is particularly preferred as the graft base B.1.2.

Particularly preferred polymers B.1 are, for example, ABS or MBS polymers, such as are described e.g. in DE-OS 2 035 390 (=U.S. Pat. No. 3,644,574) or in DE-OS 2 248 242 (=GB 1 409 275) and in Ullmanns, Enzyklopadie der Technischen Chemie, vol. 19 (1980), p. 280 et seq.

The graft copolymers B.1 are prepared by free radical polymerization, e.g. by emulsion, suspension, solution or bulk polymerization, preferably by emulsion or bulk polymerization, in particular by emulsion polymerization.

In graft polymers B.1 which have been prepared in the emulsion polymerization process, the content of graft base B.1.2 is preferably 20 to 95 wt. %, particularly preferably 40 to 85 wt. %, in particular 50 to 75 wt. %, in each case based on B.1.

In graft polymers B.1 which have been prepared in the bulk process, the content of graft base B.1.2 is preferably 5 to 50 wt. %, particularly preferably 8 to 25 wt. %, in particular 10 to 20 wt. %, in each case based on B.1.

The gel content of the graft base B.1.2 is at least 30 wt. %, preferably at least 40 wt. %, in particular at least 60 wt. %, in each case based on B.1.2 and measured as the insoluble content in toluene.

Particularly suitable graft rubbers are also ABS polymers which are prepared by redox initiation with an initiator system of organic hydroperoxide and ascorbic acid in accordance with U.S. Pat. No. 4,937,285.

Since as is known the grafting monomers are not necessarily grafted completely on to the graft base during the grafting reaction, according to the invention graft polymers B.1 are also understood as meaning those products which are produced by (co)polymerization of the grafting monomers in the presence of the graft base and are also obtained during the working up. These products can accordingly also contain free, i.e. not bonded chemically to the rubber, (co)polymer of the grafting monomers.

Suitable acrylate rubbers according to B.1.2 are preferably polymers of acrylic acid alkyl esters, optionally with up to 40 wt. %, based on B.1.2, of other polymerizable ethylenically unsaturated monomers. The preferred polymerizable acrylic acid esters include $C_1$ to $C_8$-alkyl esters, for example methyl, ethyl, butyl, n-octyl and 2-ethylhexyl esters; haloalkyl esters, preferably halo-$C_1$-$C_8$-alkyl esters, such as chloroethyl acrylate, and mixtures of these monomers.

For crosslinking, monomers having more than one polymerizable double bond can be copolymerized. Preferred examples of crosslinking monomers are esters of unsaturated monocarboxylic acids having 3 to 8 C atoms and unsaturated monohydric alcohols having 3 to 12 C atoms, or of saturated polyols having 2 to 4 OH groups and 2 to 20 C atoms, such as ethylene glycol dimethacrylate, allyl methacrylate; polyunsaturated heterocyclic compounds, such as trivinyl and triallyl cyanurate; polyfunctional vinyl compounds, such as di- and trivinylbenzenes; but also triallyl phosphate and diallyl phthalate. Preferred crosslinking monomers are allyl methacrylate, ethylene glycol dimethacrylate, diallyl phthalate and heterocyclic compounds which contain at least three ethylenically unsaturated groups. Particularly preferred crosslinking monomers are the cyclic monomers triallyl cyanurate, triallyl isocyanurate, triacryloylhexahydro-s-triazine, triallylbenzenes. The amount of crosslinking monomers is preferably 0.02 to 5, in particular 0.05 to 2 wt. %, based on the graft base B.1.2. In the case of cyclic crosslinking monomers having at least three ethylenically unsaturated groups, it is advantageous to limit the amount to less than 1 wt. % of the graft base B.1.2.

Preferred "other" polymerizable ethylenically unsaturated monomers which can optionally serve for preparation of the graft base B.1.2 in addition to the acrylic acid esters are e.g. acrylonitrile, styrene, α-methylstyrene, acrylamides, vinyl $C_1$-$C_6$-alkyl ethers, methyl methacrylate, butadiene. Preferred acrylate rubbers as the graft base B.1.2 are emulsion polymers which have a gel content of at least 60 wt. %.

Further suitable graft bases according to BA 0.2 are silicone rubbers having grafting-active sites, such as are described in DE-OS 3 704 657, DE-OS 3 704 655, DE-OS 3 631 540 and DE-OS 3 631 539.

The gel content of the graft base B.1.2 and of the graft polymers B.1 is determined at 25° C. in a suitable solvent as the content insoluble in these solvents (M. Hoffmann, H. Kromer, R. Kuhn, Polymeranalytik I and II, Georg Thieme-Verlag, Stuttgart 1977).

The rubber-free vinyl (co)polymers according to component B.2 are preferably rubber-free homo- and/or copolymers of at least one monomer from the group of vinylaromatics, vinyl cyanides (unsaturated nitriles), (meth)acrylic acid ($C_1$ to $C_8$)-alkyl esters, unsaturated carboxylic acids and derivatives (such as anhydrides and imides) of unsaturated carboxylic acids.

(Co)polymers B.2 which are suitable in particular are those of

B.2.1 50 to 99 wt. %, preferably 60 to 80 wt. %, in particular 70 to 80 wt. %, in each case based on the total weight of (co)polymer B.2, of at least one monomer chosen from the group of vinylaromatics, such as, for example, styrene, α-methylstyrene, vinylaromatics substituted on the nucleus, such as, for example, p-methylstyrene, p-chlorostyrene, and (meth)acrylic acid ($C_1$-$C_8$)-alkyl esters, such as, for example, methyl methacrylate, n-butyl acrylate, tert-butyl acrylate, and B.2.2 1 to 50 wt. %, preferably 20 to 40 wt. %, in particular 20 to 30 wt. %, in each case based on the total weight of (co)polymer B.2, of at least one monomer chosen from the group of vinyl cyanides, such as, for example, unsaturated nitriles, such as e.g. acrylonitrile and methacrylonitrile, (meth)acrylic acid ($C_1$-$C_8$)-alkyl esters, such as, for example, methyl methacrylate, n-butyl acrylate, tert-butyl acrylate, unsaturated carboxylic acids and derivatives of unsaturated carboxylic acids, such as, for example, maleic anhydride and N-phenyl-maleimide.

These (co)polymers B.2 are resinous, thermoplastic and rubber-free. The copolymer of B.2.1 styrene and B.2.2 acrylonitrile is particularly preferred.

Such (co)polymers B.2 are known and can be prepared by free radical polymerization, in particular by emulsion, suspension, solution or bulk polymerization. The (co)polymers preferably have average molecular weights $M_w$ (weight-average, determined by GPC) of between 15,000 and 250,000 g/mol, preferably in the range of 80,000 to 150,000 g/mol.

Component C

The composition can comprise commercially available polymer additives as component C. Possible commercially available polymer additives according to component C are additives such as, for example, flameproofing agents (for example phosphorus compounds, such as phosphoric or phosphonic acid esters, phosphonatamines and phosphazenes, or halogen compounds), flameproofing synergists (for example nanoscale metal oxides), smoke-suppressing additives (for example boric acid or borates), antidripping agents (for example compounds from the substance classes of fluorinated polyolefins, of silicones and aramid fibres), internal and external lubricants and mould release agents (for example pentaerythritol tetrastearate, stearyl stearate, montan wax or polyethylene wax), flowability auxiliary agents (for example low molecular weight vinyl (co)polymers), antistatics (for example block copolymers of ethylene oxide and propylene oxide, other polyethers or polyhydroxy ethers, polyether amides, polyester amides or sulfonic acid salts), conductivity additives (for example conductive carbon black or carbon nanotubes), nucleating agents, stabilizers (for example UV/light stabilizers, heat stabilizers, antioxidants, transesterification inhibitors, agents which prevent hydrolysis), antibacterially acting additives (for example silver or silver salts), additives which improve scratch resistance (for example silicone oils or hard fillers, such as ceramic (hollow) spheres), IR absorbents, optical brighteners, fluorescent additives, fillers and reinforcing substances (for example talc, optionally ground glass or carbon fibres, glass or ceramic (hollow) spheres, mica, kaolin, $CaCO_3$ and glass flakes) and dyestuffs and pigments (for example carbon black, titanium dioxide or iron oxide), impact modifiers which do not fall under the definition of B.1 and Brønsted acid compounds as base scavengers, or mixtures of several of the additives mentioned.

Polyurethanes

A polyurethane foam or a compact polyurethane layer is preferably employed as the coating.

The polyurethanes employed according to the invention are obtained by reaction of polyisocyanates with H-active polyfunctional compounds, preferably polyols.

In this context, the term "polyurethane" is understood in the context of this invention as also meaning polyurethane-ureas, in which those compounds with N—H functionality, optionally in a mixture with polyols, are employed as H-active polyfunctional compounds.

Suitable polyisocyanates are the aromatic, araliphatic, aliphatic or cycloaliphatic polyisocyanates known per se to the person skilled in the art having an NCO functionality of preferably ≥2, which can also contain iminooxadiazinedione, isocyanurate, uretdione, urethane, allophanate, biuret, urea, oxadiazinetrione, oxazolidinone, acylurea and/or carbodiimide structures. These can be employed individually or in any desired mixtures with one another.

In this context, the abovementioned polyisocyanates are based on di- and triisocyanates which are known per se to the person skilled in the art and have aliphatically, cycloaliphatically, araliphatically and/or aromatically bonded isocyanate groups, it being irrelevant whether these have been prepared using phosgene or by phosgene-free processes. Examples of such di- and triisocyanates are 1,4-diisocyanatobutane, 1,5-diisocyanatopentane, 1,6-diisocyanatohexane (HDI), 2-methyl-1,5-diisocyanatopentane, 1,5-diisocyanato-2,2-dimethylpentane, 2,2,4- and 2,4,4-trimethyl-1,6-diisocyanatohexane, 1,10-diisocyanatodecane, 1,3- and 1,4-diisocyanatocyclohexane, 1,3- and 1,4-bis-(isocyanatomethyl)-cyclohexane, 1-isocyanato-3,3,5-trimethyl-5-isocyanatomethylcyclohexane (isophoronediisocyanate, IPDI), 4,4'-diisocyanatodicyclohexylmethane (Desmodur® W, Bayer AG, Leverkusen, DE), 4-isocyanatomethyl-1,8-octane-diisocyanate (triisocyanatononane, TIN), ω,ω'-diisocyanato-1,3-dimethylcyclohexane ($H_6$XDI), 1-isocyanato-1-methyl-3-isocyanato-methylcyclohexane, 1-isocyanato-1-methyl-4-isocyanato-methylcyclohexane, bis-(isocyanatomethyl)-norbornane, 1,5-naphthalene-diisocyanate, 1,3- and 1,4-bis-(2-isocyanato-prop-2-yl)-benzene (TMXDI), 2,4- and 2,6-diisocyanatotoluene (TDI), in particular the 2,4 and the 2,6 isomer and technical grade mixtures of the two isomers, 2,4'- and 4,4'-diisocyanatodiphenylmethane (MDI), polymeric MDI (pMDI), 1,5-diisocyanatonaphthalene, 1,3-bis(isocyanato-methyl)benzene (XDI) and any desired mixtures of the compounds mentioned.

In this context, the polyisocyanates preferably have an average NCO functionality of from 2.0 to 5.0, preferably from 2.2 to 4.5, particularly preferably from 2.2 to 2.7, and a content of isocyanate groups of from 5.0 to 37.0 wt. %, preferably from 14.0 to 34.0 wt. %.

In a preferred embodiment, polyisocyanates or polyisocyanate mixtures of the abovementioned type with exclusively aliphatically and/or cycloaliphatically bonded isocyanate groups are employed.

Very particularly preferably, the polyisocyanates of the abovementioned type are based on hexamethylene-diisocyanate, isophorone-diisocyanate, the isomeric bis-(4,4'-isocyanatocyclohexyl)methanes and mixtures thereof.

Among the higher molecular weight modified polyisocyanates, the prepolymers known from polyurethane chemistry having terminal isocyanate groups of the molecular weight range of 400 to 15,000, preferably 600 to 12,000 are of interest in particular. These compounds are prepared in a manner known per se by reaction of excess amounts of simple polyisocyanates of the type mentioned by way of example with organic compounds having at least two groups which are reactive towards isocyanate groups, in particular organic polyhydroxy compounds. Suitable such polyhydroxy compounds are both simple polyfunctional alcohols of the molecular weight range of 82 to 599, preferably 62 to 200, such as e.g. ethylene glycol, trimethylolpropane, propane-1, 2-diol or butane-1,4-diol or butane-2,3-diol, but in particular higher molecular weight polyether polyols and/or polyester polyols of the type known per se from polyurethane chemistry with molecular weights of from 600 to 12,000, preferably 800 to 4,000, which have at least two, as a rule 2 to 8, but preferably 2 to 6 primary and/or secondary hydroxyl groups. Those NCO prepolymers which have been obtained, for example, from low molecular weight polyisocyanates of the type mentioned by way of example and less preferred compounds having groups which are reactive towards isocyanate groups, such as e.g. polythioether polyols, polyacetals containing hydroxyl groups, polyhydroxy-polycarbonates, polyesteramides containing hydroxyl groups or copolymers, containing hydroxyl groups, of olefinically unsaturated compounds, can of course also be employed.

Compounds which have groups which are reactive towards isocyanate groups, in particular hydroxyl, and are suitable for the preparation of the NCO prepolymers are, for example, the compounds disclosed in U.S. Pat. No. 4,218,543. In the preparation of the NCO prepolymers, these compounds having groups which are reactive towards isocyanate groups are reacted with simple polyisocyanates of the type mentioned above by way of example, while maintaining an NCO excess. The NCO prepolymers in general have an NCO content of from 10 to 26, preferably 15 to 26 wt. %. It already emerges from this that in the context of the present invention, "NCO prepolymers" or "prepolymers having terminal isocyanate groups" are to be understood as meaning both the reaction products as such and the mixtures with excess amounts of unreacted starting polyisocyanates, which are often also called "semi-prepolymers".

Possible aliphatic diols having an OH number of >500 mg of KOH/g are the chain lengtheners conventionally used in polyurethane chemistry, such as ethylene glycol, diethylene glycol, propylene glycol, dipropylene glycol, butane-1,4-diol, propane-1,3-diol. Diols, such as 2-butane-1,4-diol, butene-1,3-diol, butane-2,3-diol and/or 2-methylpropane-1, 3-diol, are preferred. It is of course also possible to employ the aliphatic diols in a mixture with one another.

Suitable H-active components are polyols having an average OH number of from 5 to 600 mg of KOH/g and an average functionality of from 2 to 6. Polyols having an average OH number of from 10 to 50 mg of KOH/g are preferred. Polyols which are suitable according to the invention are, for example, polyhydroxy-polyethers, which are accessible by alkoxylation of suitable starter molecules, such as ethylene glycol, diethylene glycol, 1,4-dihydroxybutane, 1,6-dihydroxyhexane, dimethylolpropane, glycerol, pentaerythritol, sorbitol or sucrose. Ammonia or amines, such as ethylenediamine, hexamethylenediamine, 2,4-diaminotoluene, aniline or amino alcohols, or phenols, such as bisphenol A, can likewise functions as starters. The alkoxylation is carried out using propylene oxide and/or ethylene oxide in any desired sequence or as a mixture.

In addition to polyols, at least one further crosslinking agent and/or chain lengthener chosen from the group which contains amines and amino alcohols, for example ethanolamine, diethanolamine, diisopropanolamine, ethylenediamine, triethanolamine isophoronediamine, N,N'-dimethyl (diethyl)-ethylenediamine, 2-amino-2-methyl(or ethyl)-1-propanol, 2-amino-1-butanol, 3-amino-1,2-propanediol, 2-amino-2-methyl(ethyl)-1,3-propanediol, and alcohols, for example ethylene glycol, diethylene glycol, 1,4-dihydroxybutane, 1,6-dihydroxyhexane, dimethylolpropane, glycerol and pentaerythritol, and sorbitol and sucrose, or mixtures of these compounds, can additionally be present.

Polyester polyols such as are accessible in a manner known per se by reaction of low molecular weight alcohols with polyfunctional carboxylic acids, such as adipic acid, phthalic acid, hexahydrophthalic acid, tetrahydrophthalic acid or the anhydrides of these acids are furthermore suitable as long as the viscosity of the H-active component does not become too high. A preferred polyol which contains ester groups is castor oil. In addition, formulations with castor oil such as can be obtained by dissolving resins, e.g. aldehyde-ketone resins, and modifications of castor oil and polyols based on other natural oils are also suitable.

Those higher molecular weight polyhydroxy-polyethers in which high molecular weight polyadducts or polycondensates or polymers are present in finely disperse, dissolved or grafted-on form are likewise suitable. Such modified polyhydroxy compounds are obtained in a manner known per se, e.g. when polyaddition reactions (e.g. reactions between polyisocyanates and amino-functional compounds) or polycondensation reactions (e.g. between formaldehyde and phenols and/or amines) are allowed to proceed in situ in the compounds containing hydroxyl groups. However, it is also possible to mix a ready-made aqueous polymer dispersion with a polyhydroxy compound and then to remove the water from the mixture.

Polyhydroxy compounds modified by vinyl polymers, such as are obtained e.g. by polymerization of styrene and acrylonitrile in the presence of polyethers or polycarbonate polyols, are also suitable for the preparation of polyurethanes. If polyether polyols which have been modified in accordance with DE-A 2 442 101, DE-A 2 844 922 and DE-A 2 646 141 by grafting polymerization with vinylphosphonic acid esters and optionally (meth)acrylonitrile, (meth)acrylamide or OH-functional (meth)acrylic acid esters are used, plastics of particular flame resistance are obtained.

Representatives of the compounds mentioned which are to be used as H-active compounds are described e.g. in High Polymers, vol. XVI, "Polyurethanes Chemistry and Technology", Saunders-Frisch (ed.) Interscience Publishers, New York, London, vol. 1, p. 32-42, 44, 54 and vol. II, 1984, p. 5-6 and p. 198-199.

Mixtures of the compounds listed can also be employed.

The limit to the average OH number and average functionality of the H-active component results in particular from the increasing embrittlement of the resulting polyurethane. However, the possibilities of influencing the physical polymer properties of the polyurethane are known in principle to the person skilled in the art, so that the NCO component, aliphatic diol and polyol can be coordinated to one another in a favourable manner.

The polyurethane layer (b) can be foamed or solid, such as e.g. as a lacquer or coating.

All auxiliary substances and additives known per se, such as e.g. release agents, blowing agents, fillers, catalysts and flameproofing agents, can be employed for the production thereof.

In this context, auxiliary substances and additives which are optionally to be used are:

a) Water and/or Readily Volatile Inorganic or Organic Substances as Blowing Agents Possible organic blowing agents are e.g. acetone, ethyl acetate, halogen-substituted alkanes, such as methylene chloride, chloroform, ethylidene chloride, vinylidene chloride, monofluorotrichloromethane, chlorodifluoromethane, dichlorodifluoromethane, and furthermore butane, hexane, heptane or diethyl ether, and possible inorganic blowing agents are air, $CO_2$ or $N_2O$. A blowing action can also be achieved by addition of compounds which decompose at temperatures above room temperature with splitting off of gases, for example nitrogen, e.g. azo compounds, such as azodicarboxamide or azoisobutyric acid nitrile.

b) Catalysts

The catalysts are, for example, tertiary amines (such as triethylamine, tributylamine, N-methylmorpholine, N-ethylmorpholine, N,N,N',N'-tetramethylethylenediamine, pentamethyldiethylenetriamine and higher homologues, 1,4-diazabicyclo-(2,2,2)octane, N-methyl-N'-dimethylaminoethylpiperazine, bis-(dimethylaminoalkyl)piperazines, N,N-dimethylbenzylamine, N,N-dimethylcyclohexylamine, N,N-diethylbenzylamine, bis-(N,N-diethylaminoethyl) adipate, N,N,N',N'-tetramethyl-1,3-butanediamine, N,N-dimethyl-β-phenylethylamine, 1,2-dimethylimidazole, 2-methylimidazole), monocyclic and bicyclic amides, bis-(dialkylamino)alkyl ethers, tertiary amines containing amide groups (preferably formamide groups), Mannich bases of secondary amines (such as dimethylamine) and aldehydes (preferably formaldehyde) or ketones (such as acetone, methyl ethyl ketone or cyclohexanone) and phenols (such as phenol, nonylphenol or bisphenol), tertiary amines containing hydrogen atoms which are active towards isocyanate groups (e.g. triethanolamine, triisopropanolamine, N-methyldiethanolamine, N-ethyldiethanolamine, N,N-dimethylethanolamine) and reaction products thereof with alkylene oxides, such as propylene oxide and/or ethylene oxide, secondary-tertiary amines, silaamines with carbon-silicon bonds (2,2,4-trimethyl-2-silamorpholine and 1,3-diethylaminomethyltetramethyldisiloxane), nitrogen-containing bases (such as tetraalkylammonium hydroxides), alkali metal hydroxides (such as sodium hydroxide), alkali metal phenolates (such as sodium phenolate), alkali metal alcoholates (such as sodium methylate), and/or hexahydrotriazines.

The reaction between NCO groups and Zerewitinoff-active hydrogen atoms is also greatly accelerated in a manner known per se by lactams and azalactams, an associate between the lactam and the compound with acidic hydrogen initially being formed.

Organometallic compounds, in particular organotin and/or bismuth compounds, can also be used as catalysts. Possible organotin compounds are, in addition to sulfur-containing compounds, such as di-n-octyl-tin mercaptide, preferably tin (II) salts of carboxylic acids, such as tin(II) acetate, tin(II) octoate, tin(II) ethylhexoate and tin(II) laurate, and the tin (IV) compounds, e.g. dibutyltin oxide, dibutyltin dichloride, dibutyltin diacetate, dibutyltin dilaurate, dibutyltin maleate or dioctyltin diacetate. Organic bismuth catalysts are described, for example, in the patent application WO 2004/000905.

All the abovementioned catalysts can of course be employed as mixtures. In this context, combinations of organometallic compounds and amidines, aminopyridines or hydrazinopyridines are of particular interest.

The catalysts are as a rule employed in an amount of from about 0.001 to 10 wt. %, based on the total amount of compounds with at least two hydrogen atoms which are reactive towards isocyanates.

c) Surface Active Additives, Such as Emulsifiers and Foam Stabilizers.

Possible emulsifiers are e.g. the sodium salts of castor oil sulfonates or salts of fatty acids with amines, such as diethylamine oleate or diethanolamine stearate. Alkali metal or ammonium salts of sulfonic acids, such as, for example, of dodecylbenzenesulfonic acid or dinaphthylmethanedisulfonic acid, or of fatty acids, such as ricinoleic acid, or of polymeric fatty acids can also be co-used as surface-active additives.

Possible foam stabilizers are, above all, polyether-siloxanes, specifically water-soluble representatives. These compounds are in general built up such that a copolymer of ethylene oxide and propylene oxide is bonded to a polydimethylsiloxane radical. Polysiloxane/polyoxyalkylene copolymers branched several times via allophanate groups are of particular interest.

d) Reaction Retardants

Possible reaction retardants are e.g. acid-reacting substances (such as hydrochloric acid or organic acid halides).

e) Additives

Possible PU additives are, for example, cell regulators of the type known per se (such as paraffins or fatty alcohols) or dimethylpolysiloxanes and pigments or dyestuffs and flameproofing agents of the type known per se (e.g. trischloroethyl phosphate, tricresyl phosphate or ammonium phosphate and polyphosphate), and furthermore stabilizers against the influences of ageing and weathering, plasticizers and fungistatically and bacteriostatically acting substances as well as fillers (such as barium sulfate, kieselguhr, carbon black or prepared chalk).

Further examples of surface-active additives and foam stabilizers as well as cell regulators, reaction retardants, stabilizers, flame-retardant substances, plasticizers, dyestuffs and fillers and fungistatically and bacteriostatically active substances optionally to be co-used according to the invention are known to the person skilled in the art and described in the literature.

EXAMPLES

Polycarbonate Compositions

Component A-1

Linear polycarbonate based on bisphenol A having a weight-average molecular weight $M_w$ of 17,000 g/mol.

Component A-2

Linear polycarbonate based on bisphenol A having a weight-average molecular weight $M_w$ of 25,000 g/mol.

Component A-3

Linear polycarbonate based on bisphenol A having a weight-average molecular weight $M_w$ of 28,000 g/mol.

Component A-4

Linear polycarbonate based on bisphenol A having a weight-average molecular weight $M_w$ of 30,000 g/mol.

Component A-5

Polybutylene terephthalate having a melt volume flow rate (MVR) of 14 $cm^3$/10 min at 260° C./2.16 kg measured in accordance with ISO 1133.

Component B-1

Precompound of an ABS graft polymer prepared in emulsion and an SAN polymer prepared in bulk polymerization. The precompound has an acrylonitrile:butadiene:styrene weight ratio of 20:28:52 wt. %.

Component B-2

Precompound of an ABS graft polymer prepared in emulsion and an SAN polymer prepared in bulk polymerization. The precompound has an acrylonitrile:butadiene:styrene weight ratio of 16:27:57 wt. %.

Component B-3

ABS graft polymer having a core-shell structure prepared in emulsion polymerization, comprising 42 wt. % of styrene/acrylonitrile copolymer with a ratio of styrene to acrylonitrile of 72:28 wt. % as the shell on 58 wt. % of a particulate graft base having an average particle size $d_{50}$ of 0.3 μm as the core, the graft base comprising pure polybutadiene rubber.

Component B-4

ABS polymer prepared by bulk polymerization of 88 wt. %, based on the ABS polymer, of a mixture of 24 wt. % of acrylonitrile and 76 wt. % of styrene in the presence of 12 wt. %, based on the ABS polymer, of a linear polybutadiene rubber.

Component B-5

Clearstrength® E920: methyl methacrylate/butadiene/styrene polymer (MBS) having a core-shell structure, prepared in emulsion polymerization, with a polybutadiene content of about 75 wt. % (Arkema, France).

Component B-6

Styrene/acrylonitrile copolymer (SAN) with a styrene/acrylonitrile weight ratio of 76:24.

Component B-7

Paraloid® EXL 2650: methyl methacrylate/butadiene polymer (MB) having a core-shell structure, prepared in emulsion polymerization, with a polybutadiene content of about 80 wt. % (Rohm & Haas, France).

Component C

C1: Pentaerythritol tetrastearate (PETS) as a lubricant/mould release agent

C2: Irganox® B900: mixture of 80 wt. % of Irgafos® 168 (tris-(2,4-di-tert-butyl)phenyl phosphite) and 20 wt. % of Irganox® 1076 (octadecyl 3-(3,5-di-tert-butyl-4-hydroxyphenyl)propionate) (BASF, Germany)

C3: Irganox® 1076 (octadecyl 3-(3,5-di-tert-butyl-4-hydroxyphenyl)propionate) (BASF, Germany)

C4: Carbon black as a pigment

Reactive Polyurethane Raw Material Mixture

Mixtures of Bayflex® VP.PU 47IF01A (polyol component) and Desmodur® VP.PU 48IF30 (diisocyanate component), both from Bayer MaterialScience AG, Leverkusen, Germany, having characteristic numbers of from 90 to 115 were employed as the polyurethane coating system.

Bayflex® VP.PU 47IF01A is a polyol based on a long-chain polyether and containing ethanediol, diethanolamine, isophoronediamine, having a viscosity according to DIN 53019 of 1,600 mPa·s at 20° C., a density according to DIN 51757 of 1.04 g/cm$^3$ at 20° C. and a hydroxyl number of 166 mg of KOH/g.

Desmodur® VP.PU 48IF30 is an aliphatic isocyanate based on isophorone-diisocyanate (IPDI) and having an NCO content according to DIN EN ISO 11909 of 30.5 wt. %, a viscosity at 23° C. according to DIN EN ISO 3219/A.3 of 200 mPa·s and a density at 20° C. according to DIN EN ISO 2811 of 1.1 g/cm$^3$.

Preparation and Characterization of the Polycarbonate Moulding Compositions

The starting substances listed in Tables 1 to 3 are compounded on a twin-screw extruder (ZSK-25) (Werner and Pfleiderer) at a speed of rotation of 220 rpm and with a throughput of 20 kg/h at a melt temperature in the range of from 260 to 280° C. and, after cooling and solidification of the melt of the compound, the compound is granulated.

The granules resulting from the particular compounding are processed on an injection moulding machine (Arburg) at melt temperatures of 260° C. and a mould temperature of 80° C. to give test specimens of dimensions 80 mm×10 mm×4 mm.

Unless stated otherwise, the values mentioned in the present application are determined by the following methods.

The ductility of the moulding compositions is evaluated with the aid of the notched impact strength value $a_k$ measured on these test specimens in accordance with ISO 180-1A at 23° C. and −30° C.

The heat distortion temperature is evaluated with the aid of the Vicat B120 or Vicat B50 value measured on these test specimens in accordance with ISO 306.

The melt flowability is evaluated with the aid of the melt viscosity measured at 260° C. and a shear rate of 1,000 s$^{-1}$ in accordance with ISO 11443.

The adhesive bond between the substrate of polycarbonate composition and the polyurethane skin is determined on strip samples with a width of 20 mm, sawn out of the partially PU-coated 2-component composite sheets produced in this way, by a roller peel test in accordance with DIN 53357 A at a test speed of 100 mm/min.

Production of the Composite Components

Mouldings partially coated on the surface with a projected area of 412 cm$^2$ were produced on an injection moulding machine in an injection mould with two cavities (a substrate-side cavity and a polyurethane-side coating cavity, which was coupled to an RIM unit). The composite component is a sheet-like component of a thermoplastic (support), the surface of which was partially coated with a polyurethane skin. The wall thickness of the support moulding was approx. 4 mm. The polyurethane layer thickness was likewise 4 mm.

The process according to the invention for the production of the composite components according to the invention described in the examples is shown in FIG. 1 for better illustration.

In the first process step, the support moulding was produced. For this, thermoplastic granules of the compositions as described in Tables 1 to 3 were melted in an injection moulding cylinder and the melt was injected at a temperature of 270° C. into the first mould cavity of the closed mould (steps 1 and 2 in FIG. 1). This mould cavity was temperature-controlled at temperatures of 80 or 100° C. At the end of the holding pressure time and cooling time, which led to solidification of the support, the mould was opened in the second process step (step 3 in FIG. 1). The support component produced was held here on the ejector side of the injection mould and passed from the support position (step 3 in FIG. 1) complete with the mould core via a slide into the coating position (step 4 in FIG. 1). Thereafter, the injection mould was closed again (step 5 in FIG. 1), a closing force for a pressure of at most 200 bar was built up, and in the third process step the solvent-free reactive polyurethane system (see above) was injected into the coating cavity under a pressure of approx. 30 bar (step 6 in FIG. 1). The two reactive components of the polyurethane coating system were conveyed here by the RIM unit into a high pressure counter-flow mixing head and mixed there before the injection. The cavity on the PU side was temperature-controlled here at temperatures of 80 or 100° C. After the end of the injection, the injection nozzle of the polyurethane mixing head was sealed by means of a hydraulic cylinder under a pressure of initially 50 bar, in order to prevent the coating material from flowing back. At the end of the reaction and cooling time, in the fourth process step the mould was opened a further time (step 7 in FIG. 1) and the coated moulding was removed from the mould (step 8 in FIG. 1).

Table 1 shows the influence of the support compositions (polyurethane system in all cases: mixture of Bayflex VP.PU 47IF01A and Desmodur VP.PU 48IF30 with a characteristic number of 95; temperature of the mould cavity on the substrate side in all cases: 80° C., temperature of the mould cavity on the PU side in all cases: 80° C.) on the adhesion between the layers of the composite component.

TABLE 1

|  | 1 (C) | 2 (C) | 3 (C) | 4 | 5 | 6 (C) | 7 | 8 | 9 | 10 |
|---|---|---|---|---|---|---|---|---|---|---|
| A1 |  |  |  |  |  |  |  | 71 |  |  |
| A2 |  |  |  |  |  |  |  |  | 71 |  |
| A3 |  | 50 | 61 | 71 | 80 | 98 | 71 |  |  |  |
| A4 |  |  |  |  |  |  |  |  |  | 71 |
| B1 |  |  |  |  |  |  | 27 | 27 |  |  |
| B2 | 54 | 30 | 23.4 | 17.4 | 12 | 1.2 |  |  | 25 |  |
| B3 | 3 |  |  |  |  |  |  |  |  |  |
| B4 | 23 | 11.5 | 9 | 6.7 | 4.6 | 0.46 |  |  | 4 | 22 |
| B5 |  |  |  |  |  |  |  |  |  | 7 |
| B6 | 20 | 8.5 | 6.6 | 4.9 | 3.4 | 0.34 | 2 | 2 |  |  |
| C1 | 0.75 | 0.75 | 0.75 | 0.75 | 0.75 | 0.75 | 0.75 | 0.75 | 0.75 | 0.75 |
| C2 | 0.10 | 0.10 | 0.10 | 0.10 | 0.10 | 0.10 | 0.10 | 0.10 | 0.10 | 0.10 |
| C3 | 0.20 | 0.20 | 0.20 | 0.20 | 0.20 | 0.20 | 0.20 | 0.20 | 0.20 | 0.20 |
| C4 | 0.2 | 0.2 | 0.2 | 0.2 | 0.2 | 0.2 | 0.2 | 0.2 | 0.2 | 0.2 |
| Adhesion of the support to the PU skin [N/mm] | 0.40 | 0.38 | 0.75 | 1.08 | 1.50 | 2.40 | 1.12 | 1.28 | 1.05 | 1.03 |
| ak (23° C.) - 260° C. [kJ/m$^2$] | 25 | 48 | 49 | 52 | 66 | 13 | 51 | 35 | 48 | 59 |
| ak (−30° C.) - 260° C. [kJ/m$^2$] | 11 | 27 | 27 | 26 | 26 | 11 | 40 | 17 | 36 | n.m.* |
| Vicat B 120 [° C.] | 99.0 | 110.3 | 120.0 | 129.2 | 139.1 | 142.9 | 131.3 | 128.3 | 130.2 | 128.7 |
| Melt viscosity (260° C./1,000 s$^{-1}$ ([Pa · s] | 154 | 186 | 205 | 238 | 309 | 630 | 289 | 188 | 254 | 234 |

*not measured

In Table 2, the influence of a polyester-containing system on the adhesion of the composite component is shown (PU system: mixture of Bayflex VP.PU 47IF01A and Desmodur VP.PU 48IF30 with a characteristic number of 95; temperature of the mould cavity on the substrate side: 80° C., temperature of the mould cavity on the PU side: 80° C.).

TABLE 2

|  | 11 |
|---|---|
| A2 | 46.81 |
| A5 | 40.30 |
| B7 | 12.00 |
| C1 | 0.59 |
| C2 | 0.30 |
| C4 | 0.20 |
| Adhesion of the support to the PU skin [N/mm] | 3.90 |
| ak (23° C.)-260° C. [kJ/m$^2$] | 50 |
| ak (−30° C.)-260° C. [kJ/m$^2$] | 45 |
| Vicat B50 [° C.] | 122.0 |
| Melt viscosity (260° C./1,000 s$^{-1}$([Pa · s] | not measured |

Table 3 shows influences of the polyurethane composition and the mould temperatures (composition of the substrate material in all cases of Example 9 in Table 1)

TABLE 3

|  | 12 | 9 | 13 | 14 | 15 | 16 |
|---|---|---|---|---|---|---|
| Characteristic number of the PU system | 90 | 95 | 105 | 115 | 105 | 105 |
| Temperature of the mould cavity on the substrate side [° C.] | 80 | 80 | 80 | 80 | 100 | 100 |
| Temperature of the mould cavity on the PU side [° C.] | 80 | 80 | 80 | 80 | 80 | 100 |
| Adhesion of the support to the PU skin [N/mm] | 0.91 | 1.05 | 1.27 | 2.50 | 0.84 | 0.95 |

The examples in Table 1 show that surprisingly and in contrast to the teaching from the prior art, an improvement in the adhesive bond between the thermoplastic support and PU layer is achieved at the level sought of at least 1 N/mm in the 2-component composite component produced by the process according to the invention if the content of component A in the support composition exceeds a value of 65 parts by wt., based on the sum of A and B (Comparison Examples 1-3 and Examples 4 and 5). This is to be regarded as surprising since according to general experience and the teaching from the prior art with respect to alternative processes for the production of comparable composite components an improvement in the adhesion between polycarbonate compositions and a PU layer would have been expected with an increasing content of component B in the polycarbonate composition (see, for example, DE 10 2006 033 059 A1, which discloses that ABS materials are particularly advantageous, since these enter into permanent bonding with the top layer). The adhesive bond increases further on the other side of the content of 65 parts by wt. with increasing content of polycarbonate component A in the substrate composition (Examples 4 to 6), tough properties of the support composition no longer being realized and/or the melt flowability of the thermoplastic support composition falling to an in general unacceptable level if a content of polycarbonate component A of about 90 parts by wt., based on the sum of A and B, is exceeded. A good balance of processability (melt viscosity) and toughness of the support material and adhesive bond of the component is therefore realized only in support compositions with a content of polycarbonate component A in the range of from 65 to 90 parts by wt., based on the sum of A and B. In this concentration range for the polycarbonate component A, the adhesive bond between the support composition and polyurethane layer here proves to be largely independent of the nature of the graft polymer/vinyl (co)polymer (component B) contained in the support composition and of the molecular weight of the polycarbonate (component A) used (compare Example 4 with Examples 7-10).

Example 11 in Table 2 shows that a particularly good adhesive bond is achieved if instead of aromatic polycarbonate as component A, a mixture of aromatic polycarbonate and aromatic polyester is employed.

The examples in Table 3 show that an adequate adhesive bond is achieved if the characteristic number of the PU system is >90. A particularly good adhesive bond is achieved at a characteristic number of between 105 and 115 (compare Examples 9, 12, 13 and 14).

The examples in Table 3 moreover show that a particularly good adhesive bond is achieved if the mould temperature of the mould cavity on the substrate side is below 100° C. (compare Examples 13 and 15), and especially if moreover the mould temperature of the cavity on the PU side is in the range of greater than 80° C. (compare Examples 15 and 16).

The invention claimed is:

1. A process for a production of a composite component, said component comprising:
    a) a support of a thermoplastic composition, and
    b) at least one polyurethane layer in direct contact with the support, wherein said process comprises:
    (i) in a first process step, injecting a melt of the thermoplastic composition into a first mould cavity and subsequently cooling the melt, wherein the thermoplastic composition comprises:
       A) 65.0 to 90.0 parts by wt., based on a sum of components A and B, of at least one polymer selected from the group consisting of aromatic, polycarbonates, aromatic polyester carbonates and aromatic polyesters,
       B) 10.0 to 35.0 parts by wt., based on a sum of components A and B, of an optionally rubber-modified vinyl (co)polymer and
       C) 0 to 30.0 parts by wt., based on a sum of components A to C, of at least one polymer additive,
    (ii) in a second process step, enlarging a cavity of the injection mould to thereby generate a gap therein,
    (iii) in a third process step, injecting into said gap, a reactive polyurethane raw material mixture comprising:
       at least one polyisocyanate component,
       at least one polyfunctional H-active compound, and
       optionally at least one polyurethane additive and/or process auxiliary substance whereby the polyurethane raw material mixture polymerizes in contact with a surface of the thermoplastic composition support to give a compact polyurethane layer and/or to give a polyurethane foam layer,
    (iv) in a fourth process step, removing the composite component from the mould cavity,
and further wherein the process steps directly follow one another.

2. The process according to claim 1, wherein the reactive polyurethane raw material mixture has a characteristic number of from >90 to <125.

3. The process according to claim 1, wherein a mixture of at least one aromatic polycarbonate and/or polyester carbonate and at least one aromatic polyester is employed as component A.

4. The process according to claim 1, wherein the thermoplastic composition of the support comprises 70.0 to 80.0 parts by wt. of component A, based on the sum of components A and B.

5. The process according to claim 1, wherein process steps (ii) and (iii) are repeated at least once with variation of the reactive polyurethane raw material mixture.

6. The process according to claim 1, wherein in process step (iii), a surface of the injection mould in contact with the thermoplastic composition is temperature-controlled at a temperature from 50 to 95° C., and a surface of the injection mould in contact with the reactive polyurethane mixture is temperature-controlled at a temperature from 50 to 160° C.

7. The process according to claim 5, wherein process steps (ii) and (iii) are passed through several times, the process steps follow one another directly, and in process step (iii), a temperature of the mould cavity on the polyurethane side is at least 10° C. higher than a temperature of the mould cavity on the support side where the thermoplastic is provided.

8. The process according to claim 1, wherein component C is at least one selected from the group consisting of flameproofing agents, flameproofing synergists, smoke-suppressing additives, antidripping agents, internal and external lubricants and mould release agents, flowability auxiliary agents, antistatics, conductivity additives, nucleating agents, stabilizers, antibacterially acting additives, additives which improve scratch resistance, IR absorbents, optical brighteners, fluorescent additives, fillers and reinforcing substances, dyestuffs and pigments, impact modifiers which do not fall under the definition of component B, and Bronstedt acid compounds.

9. The process according to claim 1, whereby a two- or multicomponent part, coated with at least one polyurethane is produced in a 2-component injection molding or 2-component reactive injection moulding process.

10. The process according to claim 5, wherein process steps (ii) and (iii) are passed through several times, the process steps follow one another directly, and in process step (iii), a temperature of the mould cavity on the polyurethane side is at least 15° C. higher than a temperature of the mould cavity on the support side where the thermoplastic is provided.

11. The process according to claim 5, wherein process steps (ii) and (iii) are passed through several times, the process steps follow one another directly, and in process step (iii), a temperature of the mould cavity on the polyurethane side is at least 20° C. higher than a temperature of the mould cavity on the support side where the thermoplastic is provided.

12. The process according to claim 1, wherein the thermoplastic composition of the support a) comprises:
    A) 65.0 to 80.0 parts by wt., based on a sum of components A and B, of at least one polymer chosen from the group of aromatic polycarbonates, aromatic polyester carbonates and aromatic polyesters,
    B) 20.0 to 35.0 parts by wt., based on a sum of components A and B, of an optionally rubber-modified vinyl (co) polymer, and
    C) 0.1 to 15.0 parts by wt., based on a sum of components A to C, of a commercially available polymer additive.

13. The process according to claim 1, wherein the thermoplastic composition of the support a) comprises:
    A) 70.0 to 80.0 parts by wt., based on a sum of components A and B, of at least one polymer chosen from the group of aromatic polycarbonates, aromatic polyester carbonates and aromatic polyesters, B) 20.0 to 30.0 parts by wt., based on a sum of components A and B, of an optionally rubber-modified vinyl (co) polymer, and C) 0.2 to 5.0 parts by wt., based on a sum of components A to C, of a commercially available polymer additive.

14. The process according to claim 1, wherein the reactive polyurethane raw material mixture has a characteristic number of from 105 to 115.

15. The process according to claim 1, wherein in process step (iii), a surface of the injection mould in contact with the thermoplastic composition is temperature-controlled at a temperature from 60 to 85° C., and a surface of the injection mould in contact with the reactive polyurethane mixture is temperature-controlled at a temperature from 70 to 120° C.

16. The process according to claim 1, wherein in process step (iii), a surface of the injection mould in contact with the thermoplastic composition is temperature-controlled at a temperature from 60 to 80° C., and a surface of the injection mould in contact with the reactive polyurethane mixture is temperature-controlled at a temperature from 80 to 110° C.

* * * * *